United States Patent
Pandey et al.

(10) Patent No.: US 9,880,631 B2
(45) Date of Patent: Jan. 30, 2018

(54) INSTRUMENT INTERFACE FOR REDUCING EFFECTS OF ERRATIC MOTION

(71) Applicant: STMicroelectronics International N.V., Amsterdam (NL)

(72) Inventors: Prashant Pandey, Kanpur (IN); Ramkumar Sivakumar, Noida (IN)

(73) Assignee: STMicroelectronics International N.V., Amsterdam (NL)

( * ) Notice: Subject to any disclaimer, the term of this patent is extended or adjusted under 35 U.S.C. 154(b) by 51 days.

(21) Appl. No.: 14/474,908

(22) Filed: Sep. 2, 2014

(65) Prior Publication Data
US 2016/0062470 A1 Mar. 3, 2016

(51) Int. Cl.
| | |
|---|---|
| *G09G 5/00* | (2006.01) |
| *G06F 3/01* | (2006.01) |
| *G01B 11/00* | (2006.01) |
| *G01P 15/00* | (2006.01) |
| *G06F 3/038* | (2013.01) |
| *G06F 3/0346* | (2013.01) |
| *G06F 3/0481* | (2013.01) |
| *G06F 3/0354* | (2013.01) |

(52) U.S. Cl.
CPC .............. *G06F 3/017* (2013.01); *G01B 11/00* (2013.01); *G01P 15/00* (2013.01); *G06F 3/038* (2013.01); *G06F 3/0346* (2013.01); *G06F 3/0354* (2013.01); *G06F 3/04812* (2013.01)

(58) Field of Classification Search
CPC ........ G06F 3/033; G06F 3/038; G06F 3/0383; G06F 3/017; G06F 3/03543; G01B 11/00; G01P 15/00
See application file for complete search history.

(56) References Cited

U.S. PATENT DOCUMENTS

| | | | |
|---|---|---|---|
| 5,302,968 A | 4/1994 | Heberle | |
| 5,598,183 A * | 1/1997 | Robertson | G06F 3/04812 345/157 |
| 6,031,218 A * | 2/2000 | Piot | G06F 3/0317 250/208.2 |
| 6,509,889 B2 * | 1/2003 | Kamper | G06F 3/038 345/157 |
| 7,102,616 B1 | 9/2006 | Sleator | |
| 7,688,306 B2 * | 3/2010 | Wehrenberg | G06F 1/1616 345/156 |

(Continued)

FOREIGN PATENT DOCUMENTS

EP 0 747 851 A2 12/1996

*Primary Examiner* — Peter D McLoone
(74) *Attorney, Agent, or Firm* — Seed Intellectual Property Law Group LLP

(57) ABSTRACT

Apparatus and methods to reduce effects of erratic motion input during operation of an instrument via a graphical user interface are described. Spatial motion input received from a user may be filtered using filter parameters obtained during a calibration procedure. The filtered motion input may be used to predict a trajectory of a cursor or object used to select an icon or text. The icon or text may be latched to the approaching cursor or object. The combination of motion smoothing and latching may improve ease-of-use of the graphical user interface for individuals having neuromuscular disorder, or users operating instruments in high-vibration environments.

28 Claims, 7 Drawing Sheets

(56) References Cited

U.S. PATENT DOCUMENTS

| | | | |
|---|---|---|---|
| 7,945,072 B2* | 5/2011 | Liu | G06F 3/038 382/107 |
| 8,330,715 B2* | 12/2012 | Yadavalli | G06F 3/04812 345/156 |
| 8,566,751 B2* | 10/2013 | Kelley | G06F 3/04812 715/857 |
| 8,698,744 B2* | 4/2014 | Wehrenberg | G06F 1/1616 345/156 |
| 8,698,746 B1* | 4/2014 | Merrick | G06F 3/038 178/19.05 |
| 8,775,128 B2* | 7/2014 | Meduna | G06F 17/00 702/179 |
| 8,976,115 B2* | 3/2015 | Longe | G06F 3/0236 345/156 |
| 9,201,515 B2* | 12/2015 | Hwang | G06F 3/0346 |
| 2002/0163502 A1 | 11/2002 | Kamper et al. | |
| 2006/0017692 A1* | 1/2006 | Wehrenberg | G06F 1/1616 345/156 |
| 2006/0168548 A1* | 7/2006 | Kelley | G06F 3/04812 715/857 |
| 2007/0146325 A1* | 6/2007 | Poston | G06F 3/0317 345/163 |
| 2007/0188455 A1* | 8/2007 | O'Connell | G06F 3/0312 345/163 |
| 2008/0126073 A1* | 5/2008 | Longe | G06F 3/0236 704/1 |
| 2010/0020016 A1* | 1/2010 | Monahan | G06F 3/0383 345/164 |
| 2010/0067746 A1* | 3/2010 | Liu | G06F 3/038 382/107 |
| 2010/0127972 A1* | 5/2010 | Yadavalli | G06F 3/04812 345/157 |
| 2011/0107275 A1* | 5/2011 | Kuo | G06F 3/038 715/856 |
| 2012/0079433 A1* | 3/2012 | Hwang | G06F 3/04842 715/846 |
| 2012/0113015 A1* | 5/2012 | Werner | G06F 3/0481 345/173 |
| 2014/0129178 A1* | 5/2014 | Meduna | G06F 17/00 702/189 |
| 2014/0240233 A1* | 8/2014 | Jeong | G06F 3/0487 345/163 |
| 2015/0012248 A1* | 1/2015 | Meduna | G06F 17/00 702/189 |

* cited by examiner

INSTRUMENT INTERFACE FOR REDUCING EFFECTS OF ERRATIC MOTION

BACKGROUND

Technical Field

The technology relates to an instrument interface and/or controller that reduces undesirable effects of erratic motion during graphical-user input that is intended to control the instrument. Such spurious motion may be a result of environmental vibrations or neuromuscular disorders.

Discussion of the Related Art

Many instruments today may be operated through graphical user interfaces (GUIs), which were first implemented at the Palo Alto Research Center in 1973. GUIs have found applications on computers, smart phones, personal digital electronic devices, commercial instrumentation, automobiles, televisions, and some modern home appliances. Most GUIs provide icons and/or text menus that can be selected by a user. In some cases, selection is done with a mouse (e.g., point-and-click) or other remote controller. In some cases, selection may be done by tracing, touching and/or tapping an icon or text on a display screen with a finger or stylus. For example, the display screen may include capacitive sensors that can detect objects in close proximity to, or touching, the screen and determine the location of the object.

Although GUIs provide a convenient and user-friendly interface for a wide variety of instruments, GUIs can be difficult to operate in some environments and/or for some users. For example, it may be difficult to accurately point and click on a desired icon or text when traveling in a vehicle over rough terrain. Also, users that have neuromuscular impairments or diseases, such as those recovering from a stroke or those with Parkinson's disease, experience involuntary muscular actions that can compromise their ability to make finely controlled motions needed to point to specific locations on a GUI.

SUMMARY

Apparatus and methods for instrument interfaces that can reduce the effects of erratic motion during graphical-user input are described. In some embodiments, an instrument interface includes spatial-filtering circuitry that can be calibrated for one or more users to filter motion-input data. In some embodiments, filters for at least two axes of motion may be calibrated independently. An instrument interface may further be configured to predict a path in which continue motion is likely to occur. The instrument interface may weight one or more selectable images lying within the predicted path, and "latch" at least one of the selectable images to an approaching cursor or object that is used to select the image and activate functionality associated with the image. The combination of filtering input motion and latching can improve user friendliness of graphical user interfaces for individuals with neuromuscular disorders.

According to some embodiments, an instrument interface for operating an instrument may comprise one or more motion sensors configured to sense motion representative of user input in at least two dimensions and produce two-dimensional motion data, a first filter configured to filter the motion data corresponding to a first dimension, and a second filter configured to filter the motion data corresponding to a second dimension, wherein first parameters for the first filter are independently reconfigurable by the user from second parameters for the second filter through software operation. In some embodiments, an instrument interface may further comprise a processor and a visual display in communication with the processor. According to some embodiments, the visual display may comprise a screen of a computer or a screen of a smart phone, and the processor may comprise a central electronic processor for the instrument.

In some aspects, the first parameters and second parameters may be independently reconfigurable based upon a calibration procedure executed by at least the processor. In some implementations, the first filter or the second filter comprises a low-pass filter having a cut-off frequency that is independently reconfigurable through software operation. The first filter or the second filter may comprise a multi-tap, finite impulse response filter. According to some implementations, the number of taps may be greater than 10.

In some implementations, a processor for the instrument interface may be configured to identify motion corresponding to the user input based upon first filtered motion data received from the first filter and second filtered motion data received from the second filter. In some aspects, the processor is further configured to display and move a cursor on the visual display representative of the identified motion. According to some aspects, the processor may be further configured to predict a path for the user input based upon the identified motion and assign a weighting value to at least one selectable image in the path.

In some aspects, the processor may be further configured to latch a selectable image in the path based at least upon a weighting value of the selectable image. A latched selectable image may be an only selectable image that may be selected by the user while the selectable image is latched, according to some implementations. In some instances, the processor is configured to change the appearance of the latched selectable image while the selectable image is latched.

In some implementations, an instrument interface may be embodied as, or further comprise, a remote controller, wherein the motion sensors, first filter, and second filter are located at the remote controller.

Some embodiments comprise a remote controller for operating an instrument. The remote controller may comprise one or more motion sensors configured to sense motion representative of user input in at least two dimensions and produce two-dimensional motion data, a first filter configured to filter the motion data corresponding to a first dimension, and a second filter configured to filter the motion data corresponding to a second dimension. In some embodiments, first parameters for the first filter are independently reconfigurable by the user from second parameters for the second filter through software operation.

In some aspects, the remote controller may be configured as a computer mouse. In some implementations, the remote controller is configured to receive the first and second parameters from an external device in communication with the remote controller. The external device may be a computer.

In some implementations, the remote controller further comprises an application specific integrated circuit comprising the first filter and second filter.

The foregoing aspects, features, and implementations may be used in any suitable combination in one or more embodiments of an instrument interface that is configured to reduce effects of erratic user-input motion.

According to some embodiments, a method for operating an instrument interface may comprise acts of: (a) sensing, with motion sensors, first user-input motion in at least two dimensions, (b) producing two-dimensional motion data representative of first the user-input motion, (c) filtering, with a first filter having adjustable first filter parameters, the motion data for a first dimension, and (d) filtering, with a second filter having adjustable second filter parameters, the motion data for a second dimension. In some embodiments, a method for operating the instrument interface may further include independently reconfiguring at least the first filter parameters from the second filter parameters based at least upon the first user-input motion. The reconfiguring may be done through software operation.

In some aspects, a method for operating the instrument interface may further comprise displaying a reference path on a visual display of the instrument interface, wherein the first user-input motion is representative of tracing the reference path. In some implementations, the method may further include computing a smoothed path from the filtered motion data for the first dimension and second dimension, determining first filter parameters for the first filter by reducing an error in a first direction between the smoothed path and the reference path, and determining second filter parameters for the second filter by reducing an error in a second direction between the smoothed path and the reference path.

According to some implementations, at least the first filter comprises a first low-pass filter having a first cut-off frequency and wherein the act of independently reconfiguring comprises altering the first cut-off frequency independent of changing a parameter for the second filter. In some aspects, at least the first filter comprises a multi-tap, finite impulse response filter. The number of taps may be greater than 10 in some cases.

In some aspects, a method for operating the instrument interface may further comprise displaying and moving a cursor on a visual display of the instrument interface representative of second user-input motion. In some cases, a method may include determining a predicted path for the second user-input motion based upon filtered motion data for the second user-input motion, and assigning a weighting value to at least one selectable image in the path.

In some implementations, a method for operating the instrument interface may further comprise latching a selectable image in the predicted path based at least upon a weighting value of the selectable image. In some aspects, a method may permit selection of only a latched selectable image while the selectable image is latched. In some aspects, a method for operating an instrument interface may further comprise changing the appearance of the latched selectable image while the selectable image is latched.

The foregoing aspects and implementations of features and acts may be included in any suitable combination for one or more embodiments of methods for operating an instrument interface. Further, one or more of the methods described above may be implemented on various embodiments of instrument interfaces described above.

The foregoing summary is provided by way of illustration and is not intended to be limiting.

BRIEF DESCRIPTION OF DRAWINGS

The skilled artisan will understand that the figures, described herein, are for illustration purposes only. It is to be understood that in some instances various aspects of the embodiments may be shown exaggerated or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Aspects, embodiments, and features of the present teachings can be more fully understood from the following description in conjunction with the accompanying drawings.

DETAILED DESCRIPTION

Figure 1:
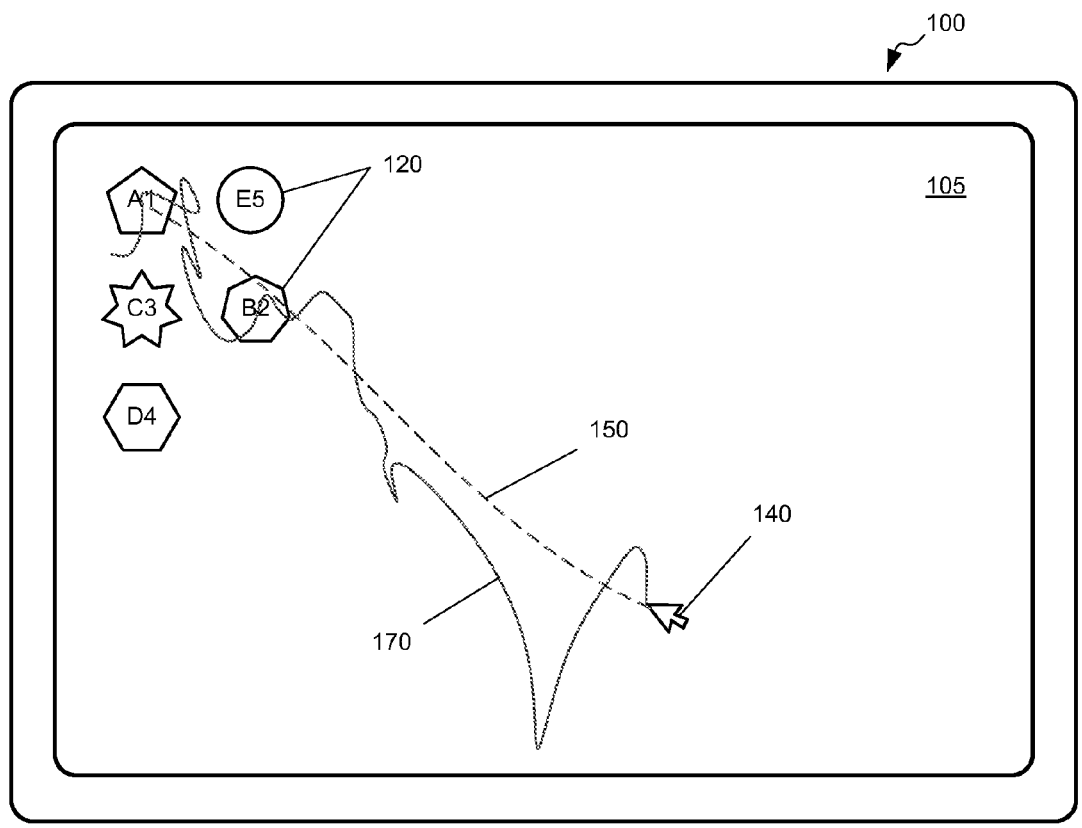
FIG. 1 illustrates a graphical user interface of an instrument and erratic input motion that may occur in some cases.

As described above, graphical user interfaces (GUIs) can provide a convenient user interface for operating various types of instruments (e.g., computers, smart phones, PDAs, smart appliances, etc.). However, the inventors have recognized that GUIs can be difficult to operate for some users (e.g., those with neuromuscular impairments such as Parkinson's disease) and in some environments (e.g., high-vibration environments). FIG. 1 illustrates an example of such difficulty.

A visual display 100 of an instrument may be presented to a user, and may comprise a screen or touch-sensitive screen 105 that includes one or more selectable images 120. The selectable images may include icons, text bars of menus, URL links, radio buttons, etc. Selection of an image 120 may initiate the execution of some specific functionality of the instrument or an application in operation on the instrument. Under some usage conditions, a user may move a cursor 140 (or stylus or finger) in a desired direction toward a selectable image (for example, the image A1) along a fairly straight path 150 and select the image by clicking a mouse, tapping a touch-sensitive pad, or touching the screen 105. For users having neuromuscular impairments or for users trying to operate the instrument in a high-vibration environment, it may not be possible to exercise fine control over the position of the cursor 140. Instead, the cursor 140 may move along a circuitous path 170 erratically, and may not be stably positioned on a selectable image due to involuntary muscular or vibrational motion. Because of the lack of fine positional control, it may be difficult to select a desired image.

The inventors have appreciated that some operating systems provide measures for reducing a speed of a cursor displayed on GUIs. For example, a cursor speed may be reduced or increased for a mouse. Changing the speed essentially changes the magnification of mouse-to-cursor motion, and is applied equally to both horizontal and vertical axes. Some systems allow the user to change the size of icons or selectable images (which may reduce the number of images that can be displayed on a screen), and some systems show a trailing cursor. Although these measures can help some users, they provide limited functional assistance and are not corrective in nature.

Figure 2:
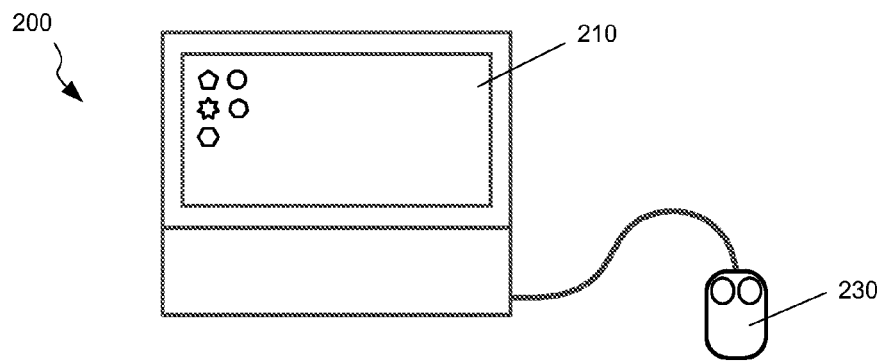
FIG. 2 depicts an embodiment of an instrument having a graphical user interface and peripheral controller, according to some embodiments.

In view of such difficulties, the inventors have developed methods and apparatus for improving an instrument's interface, so as to reduce the effects of erratic motion during a user's motion input that is intended to control the instrument. FIG. 2 depicts an instrument 200 on which the methods and apparatus for reducing effects of erratic motion input may be implemented, according to some embodiments. In overview, an instrument 200 may comprise at least one visual display 210 on which a graphical user interface may be presented to a user. According to some implementations, the visual display may be touch-sensitive, e.g., include sensors that can detect the touch or proximity of a user's finger or stylus and its location on the screen. In some embodiments, an instrument 200 may include a remote controller 230 (e.g., a mouse containing one or more motion sensors to sense motion in two directions, a hand-held controller containing an accelerometer and/or gyrometer configured to sense motion input provided by a user, a hand-held controller containing an RF or optical radiation source, etc.). The remote controller may be in communication with the instrument 200 via a wired or wireless communication link. The instrument 200 may include at least one processor and electronics configured to provide specific functionality such as communicating with networked instruments, performing mathematical calculations, providing word-processing or spreadsheet functions, providing navigational information, controlling manufacturing equipment, managing control of a machine or vehicle such as an automobile or airplane, managing control of an appliance, and managing control of heating, air, and/or ventilation equipment, for example. In some implementations, the instrument may provide a plurality of specific functionalities.

Figure 3A:
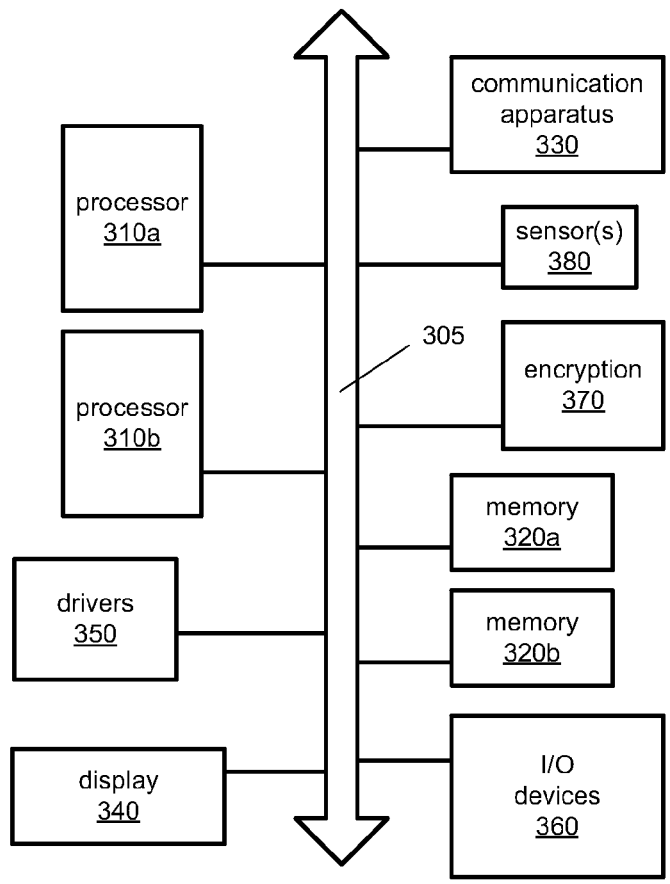
FIG. 3A depicts components of an instrument that includes a graphical user interface, in some embodiments.

In further detail, and referring to FIG. 3A, an instrument 200 may include hardware and circuitry in communication over a bus 305. According to some embodiments, instrument 200 may include at least one processor 310a, 310b. The at least one processor may be configured to manage or control operation of the instrument and peripheral devices, if present. The at least one processor may be used in combination with memory devices 320a, 320b. The memory may include any type and form of RAM-type memory device and ROM-type memory device. A memory device may store machine-readable instructions that can be loaded onto and executed by the at least one processor to specially adapt the at least one processor to perform functionality defined by the machine-readable instructions. The memory may be further used to store data collected by one or more sensors in communication with the instrument or data produced during operation of the instrument. When in operation, an operating system may execute on at least one processor and provide for user interaction and operation of the instrument, which may include running one or more software applications on the device.

According to some embodiments, a processor 310a, 310b may comprise any type and form of electronic data processing device, e.g., any one or combination of a microprocessor, microcontroller, a digital signal processor, an application specific integrated circuit (ASIC), and field-programmable gate array (FPGA). There may be more than one processor in the system in some embodiments, e.g., dual core or multi-core processors, or plural processors communicating with at least one controlling processor.

The electronic device may further include one or more display elements 340 (e.g., an alpha-numeric display, LED indicators, etc.) that may be in addition to the visual display 210. The instrument 200 may further include one or more input/output devices 360 in some embodiments (e.g., keyboard, buttons, switches, microphone, speaker, printer), and communication components 330 (e.g., networking cards or boards and associated software or firmware, wireless transceivers, and/or physical sockets). The instrument 200 may include device drivers 350, e.g., software modules specifically designed to execute on the one or more processor(s) and adapt the processor(s) to communicate with and control system components. In some embodiments, the instrument 200 may include encryption/decryption hardware and/or software 370 that may be used to encrypt selected outgoing data transmissions and decrypt incoming encrypted data transmissions. Components of the instrument 200 may communicate over a bus 305 that carries data and control signals between the components. The bus may provide for expansion of the system to include other components not shown in FIG. 3A.

In some embodiments, the instrument 200 includes at least one sensor 380 that is arranged to detect motion input provided by a user and intended to control operation of the instrument 200. The at least one sensor 380 may comprise any suitable type of motion sensor or motion sensors (e.g., an optical sensor used in a mouse, accelerometer, rotary encoder, etc.). The sensor 380 may comprise a capacitive touch-pad in some implementations, or a touch-screen in some embodiments. Touch-sensitive sensors may comprise capacitive arrays. Some sensors 380 may include a radio-frequency source and/or an RF detector for detecting user-input motion. For example, motion may be detected by triangulation of RF signals in some embodiment. Some sensors 380 may include an optical source and/or detector or imager for detecting user-input motion. In various embodiments, one or more motion sensors may be configured to produce motion data in at least two dimensions that is representative of user-input motion that is intended to control the instrument 200.

Figure 3B:
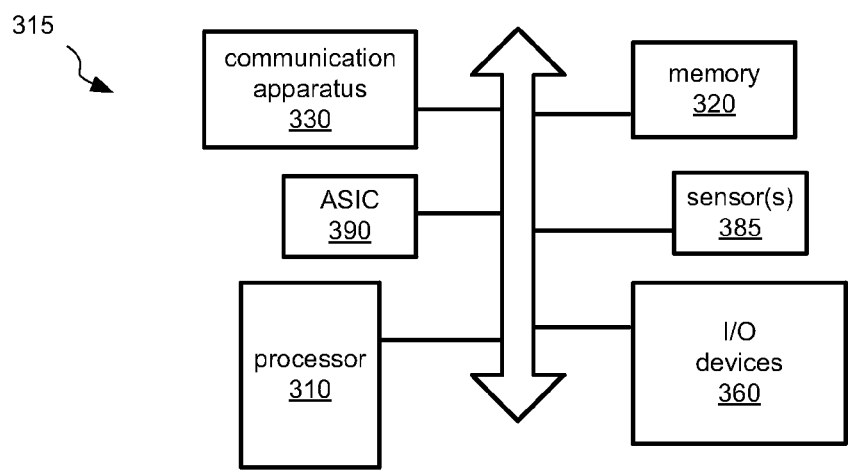
FIG. 3B depicts components of a peripheral controller, according to some embodiments.

In some embodiments, a remote controller 230 may also include circuitry and hardware as depicted in FIG. 3B. For example, a computer mouse or hand-held remote controller may or may not include a processor 310. The controller may include memory 320, and communication apparatus 330 as described above. A remote controller may further comprise input/output devices 360 (e.g., buttons, wheels, joysticks, etc.). A remote controller may include one or more sensors 385 configured to detect motion of the remote controller 230, in some embodiments. For example, some sensors 385 may comprise at least one accelerometer, a gyrometer, or a magnetometer for sensing user-input motion. Some sensors 385 may comprise a radio-frequency source and/or RF detector for detecting user-input motion. For example, motion may be detected by triangulation of RF signals.

Some sensors 385 may include an optical source and/or detector or imager for detecting user-input motion that moves the remote controller. In various embodiments, one or more motion sensors may be configured to produce motion data in at least two dimensions that is representative of user-input motion that moves the remote controller, and is intended to control the instrument 200. In some embodiments, raw or filtered motion data may be transmitted from sensors on the remote controller 230 to the instrument 200 for processing.

Figure 4A:
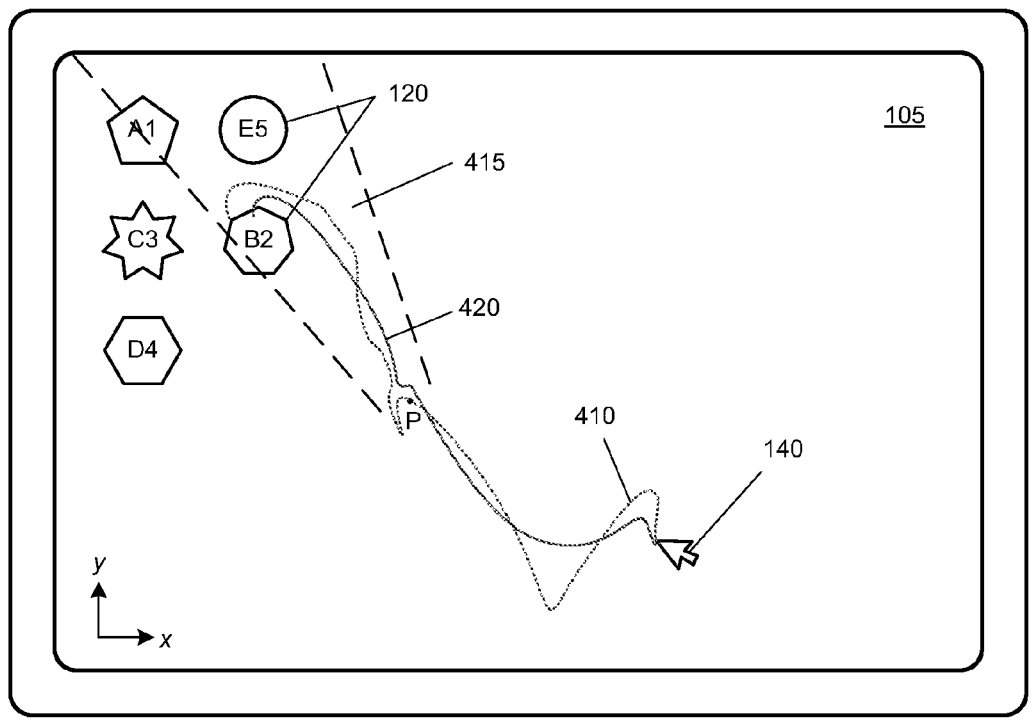
FIG. 4A depicts smoothing of erratic motion, according to some embodiments.

According to some implementations, a remote controller 230 may further include an application specific integrated circuit (ASIC) 390, machine-readable instructions placed in operation on processor 310, or a field programmable gate array (FPGA), that is specifically purposed to filter motion-input data received from the one or more sensors 385. In some embodiments, the ASIC, machine-readable instructions, or FPGA may be implemented on the instrument 200 rather than the remote controller. In various embodiments, the ASIC, machine-readable instructions, or FPGA provides spatial filtering of the motion-input data, so as to smooth out erratic motion as depicted in FIG. 4A.

For example, a user may move a cursor 140 along an actual path 410 that proceeds erratically toward a selectable image 120, and one or more sensors 380, 385 may generate raw motion data representative of the erratic path 410. The raw motion data may be received and filtered by the ASIC, processor adapted with machine-readable instructions, or FPGA to produce smoothed motion data representative of the smoothed path 420. The instrument's processor 310a, 310b may receive the smoothed motion data and identify the motion input of the user according to the smoothed motion data instead of the erratic motion data 410.

In some embodiments, an ASIC, machine-readable instructions, or FPGA may be configured to implement filtering of the raw motion data using a finite impulse response (FIR) filter having a cut-off frequency $F_c$. In some embodiments, an ASIC, machine-readable instructions, or FPGA may be configured to implement filtering of the raw motion data separately for each directional axis associated with a GUI (e.g., along X and Y axes of a visual display) using different FIR filters for each axis. The filter parameters may be set independently for each axis, and the filters may have different, and separately adjustable cut-off frequencies $F_{c,x}$, $F_{c,y}$. According to some embodiments, filtering for each axis may be implemented digitally using equations of the forms shown below for x-axis data, though other methods of filtering may be employed in other embodiments.

$$x_s[n] = \sum_{i=-N}^{M} x[n-i] * a[k] \qquad (1A)$$

where a[k] is a filter coefficient for the relevant axis. In some embodiments, the following filter may be used.

$$x_s[n] = \frac{1}{N+M+1} \sum_{i=-N}^{M} x[n-i] \qquad (1B)$$

In EQs. 1A and 1B, $x_s[n]$ represents a smoothed value for discrete x-axis motion data, and N and M may be selected through software operation to adjust the number of surrounding data points that will be included in the computation of each smoothed data value. Values for N and M may be any integer value between approximately 2 and 20, in some embodiments. According to some embodiments, a sum of N and M may be between approximately 15 and 25. In some implementations, N≈M≈10. In some embodiments, each FIR filter comprises a 21-tap low-pass filter, where cut-off frequencies are estimated during a calibration procedure.

Though EQs. 1A and 1B calculates smoothed values for position values (e.g., x position of a cursor for the nth data point), some embodiments may calculate smoothed values for changes in position Δx as follows.

$$\Delta x_s[n] = \sum_{i=-N}^{M} \Delta x[n-i] * a[k] \qquad (2)$$

The positional values x[n], y[n] or changes in position may be expressed in terms of pixels of the visual display 210, according to some embodiments.

In some implementations, positional values, or changes in position, may be sampled and/or determined at a regular frequency. The sampling frequency may be equal to or higher than sampling frequencies used for conventional graphical user interfaces. In some embodiments, the sampling frequency may be between approximately 20 Hz and approximately 500 Hz. In some embodiments, the sampling frequency may be between approximately 50 Hz and approximately 200 Hz. In some embodiments, the sampling frequency may be approximately 100 Hz. As user motion data is produced by motion sensors, the data may be provided to an ASIC, processor, or FPGA that is adapted to compute smoothed motion data values (e.g., according to EQ. 1A, 1B or EQ. 2 or other suitable filtering equation), and subsequently used by a processor 310a, 310b of the instrument 200 to identify a smoothed path 420 representative of the user's motion input.

Parameters for motion filters may be set by a user through software operation, according to some embodiments. Filter parameters may include, but are not limited to, filter coefficients for digital filters. In some embodiments, cut-off frequency, gain, and phase may be set by a user through software operation. For example and referring to EQ. 1A, an instrument 200 may include machine-readable instructions that adapt the processor 310a, 310b to display a dialog box or panel on the visual display, with which a user may enter or select values for N and M for each filter. Alternatively or additionally, the user may enter or select a cut-off frequency using a dialog box or panel.

Figure 4B:
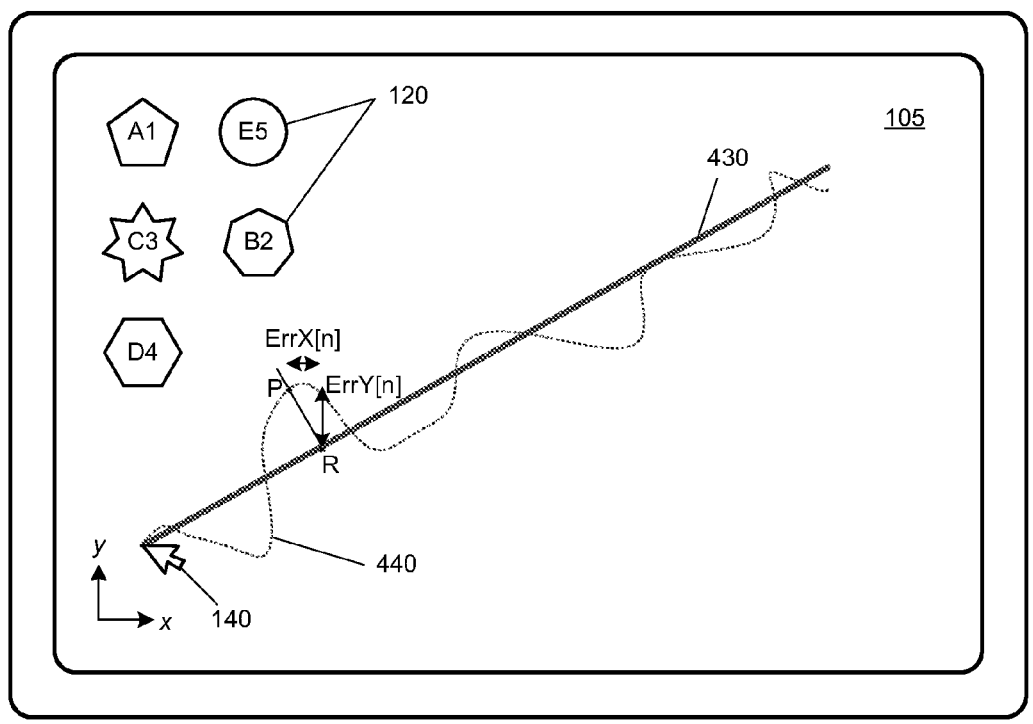
FIG. 4B illustrates aspects of a calibration routine, according to some embodiments.

In some embodiments, filter parameters may be determined through software operation using a calibration procedure that is executed by the instrument 200. For example and referring to FIG. 4B, an instrument 200 may include machine-readable instructions that adapt the instrument to display a reference path 430 and locate a cursor 140 at an end of the reference path. The instrument may prompt the user to move the cursor along the path. Due to neuromuscular impairment, for example, the user may move the cursor along an actual path 440. The instrument may then compute motion errors ErrX[n], ErrY[n] between sampled data points on the actual path 440 and corresponding points on the reference path 430, as indicated in the drawing. (In some embodiments, a motion error may be computed based upon changes in position or based upon direction.) In some implementations, a corresponding position on the reference path may be a position on the reference path 430 that lies the shortest distance from an action position P. Filter parameters may be adjusted so that a computed filtered path (not shown in FIG. 4B) may result in a reduction of positional errors ErrX[n], ErrY[n], or their sums. In some embodiments, the aspect of displaying a reference path 430, receiving motion-input data representative of a user tracing the path, computing motion errors, and adjusting filter parameters may be repeated until the positional errors are less than a predetermined value. In some implementations, averaged values of the adjusted filter parameters may be computed from the results for all trials for the user.

The averaged values for filter parameters may be stored and subsequently used during a normal mode of operation of the instrument 200. According to some embodiments, calibrations may be executed for different users, and filter parameters may be stored and subsequently used for each user. In some cases, a calibration may be executed for a usage environment (for example, riding in a vehicle over rough terrain) and employed for that environment. An instrument 200 may be configured to switch between a normal mode for motion-input operation (e.g., a mode in which motion input is processed using conventional techniques) and a "smart" motion-input mode in which user-specific or environmental-specific, motion-input filter parameters are calibrated and/or employed.

In addition to filtering motion input provided by a user, an instrument 200 may be further configured to predict a path for a user's motion input and "latch" a selectable image in the path. The predicted path may be based on filtered motion data, and may encompass an area in which continued motion is likely to occur. In some embodiments, only selectable images within the predicted path may be given a weighting value that represents a likelihood that the user intends to select the selectable image. In other embodiments, all selectable images on a display may be assigned a weighting value. In some implementations, a cursor may be latched to a selectable image with a highest weighting value.

For example and referring again to FIG. 4A, as a user's motion input may trace out an actual path 410, the motion-input data may be filtered to produce the smoothed path 420 (which may or may not be displayed on the screen 105). As the user moves toward a selectable image, the instrument 200 may compute a predicted path, and this path may change as the user continues to move toward the selectable image. For example, when the user reaches the point P in FIG. 4A, the instrument 200 may predict a path 415 delimited by the dashed lines at that moment in time. The predicted path 415 may encompass an area in which the user is likely to move a cursor, stylus, finger, or some other selecting device. In some embodiments, selectable images which are fully within the path (e.g., image E5) may be weighted. In some implementations, selectable images which intrude upon the predicted path 415 (images A1, B2) may also be weighted with a value indicating their likeness for being selected.

Figure 4C:
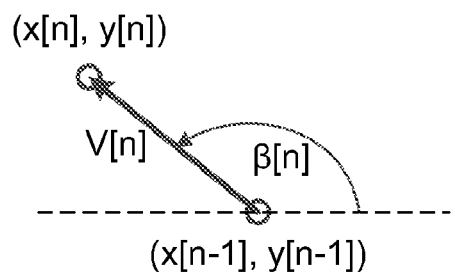
FIG. 4C depicts a directional vector V[n] associated with motion input data, according to some implementations.

The predicted path 415 may be based on any suitable algorithm. In some embodiments, the predicted path may be based at least on an averaged or unaveraged directional vector associated with the smoothed path 420. For example, directional vectors for the smoothed path may be averaged over a previous M motion increments. FIG. 4C depicts a directional vector V[n] that may be computed from two consecutive data points (x[n], y[n]), (x[n−1], y[n−1]) on a smoothed path 420. The magnitude of the directional vector may be computed from the following formula, for example.

$$\|V[n]\| = \sqrt{(x[n]-x[n-1])^2 (y[n]-y[n-1])^2} \quad (3)$$

The x[n] and y[n] values may be pixel coordinates on the visual display, in some implementations. In some embodiments, a length of the predicted path 415 may be proportional to the magnitude of the directional vector or an averaged value for M prior directional vectors. For example, if a user is moving a cursor faster, the length of the predicted path may be longer than when a user is slowing down the motion of the cursor.

The direction of a directional vector V[n] may be computed as an angle β[n] with respect to an x axis, for example. The value β[n] of may range in value as follows: 0≤β[n]≤360 degrees. As an example, the following expression may be used to compute an angle of the vector V[n] with respect to the x axis.

$$\beta_i[n] = \tan^{-1} \frac{|y[n]-y[n-1]|}{|x[n]-x[n-1]|} \quad (4)$$

The signs (+/−) of the numerator and denominator (before taking the absolute value) may be used to determine whether to add or subtract $\beta_i[n]$ from another value to determine the value of β[n]. For example, if the numerator and denominator are both positive, then β[n]=$\beta_i[n]$. If the numerator is positive and the denominator negative, then β[n]=180−$\beta_i[n]$. If the numerator and the denominator are both negative, then β[n]=180+$\beta_i[n]$. If the numerator is negative and the denominator positive, then β[n]=360−$\beta_i[n]$. EQ. 4 may not be used for cases in which the denominator is zero, to avoid problems associated with the singularity points of the tangent function. Instead, these cases may be assigned angles of 90° or 270°, depending on the polarity of the numerator. In other embodiments, the angle may be computed with reference to a y axis or other suitable reference direction.

To estimate a direction or predicted angle $\theta_p$ in which the predicted path 415 lies, one or more recently computed values for β[n] may be used. For example, recent values may be averaged using the following expression in some embodiments, though other algorithms may be used in other implementations.

$$\theta_p = \frac{1}{M+1} \sum_{k=0}^{M} \beta[n-k] \quad (5)$$

The value of M may be any non-negative integer value including zero that is less than the number of computed smoothed data points. In some embodiments, 0≤M≤40.

The width of a predicted path 415 may be predetermined. Referring again to FIG. 4A, the width of the predicted path may be narrower at an end of the path near the most recently evaluated smoothed data point P, and increase in width farther away from that point. A width of the narrow end of the predicted path may be between about 1 and about 100 pixels of a visual display, according to some embodiments. A width of a far end of the predicted path may be between about 5 and about 300 pixels, in some embodiments.

Once a predicted path 415 is computed, selectable images lying within the path may be weighted with a value that represents a likelihood that an image will be selected by the user. For example, selectable images lying more centrally within the predicted path may be given a higher weighting value than selectable images lying to a side of the path or lying partially within the predicted path. For a faster moving cursor, selectable images farther away may be weighted higher, and for a slowing cursor, selectable images nearer the cursor may be weighted higher. For example, in FIG. 4A the selectable image E5 may be assigned, by the instrument 200, a highest weighting value among the images A1, B2, and E5 for a predicted path 415 that is computed at point P. The weighting values may change as motion toward a selectable image progresses and the predicted path changes.

In some embodiments, instrument 200 may be configured to "latch" a selectable image having a highest weighting value to a cursor, stylus, or finger. Latching may take any suitable form. Two examples of latching that may be implemented by an instrument 200 are depicted in FIGS. 5A-5D, though other embodiments are possible.

Figure 5A:
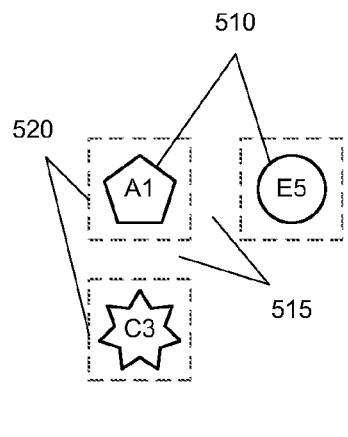
FIGS. 5A-5D illustrate aspects of latching an icon to an approaching cursor, according to some implementations.

According to some embodiments, instrument 200 may assign each selectable image 510 an active area 520 associated with the selectable image, as illustrated in FIG. 5A. Initially, the active areas 520 may all be of similar size. An active area may be identified by an instrument 200 as an area of a visual display 105 encompassing a group of pixels. When one or more of the pixels in the active area are overlapped by at least one pixel of a cursor, for example, and a selection operation is received by the instrument 200 (e.g., a mouse click), functionality associated with the selectable image within the active area will be executed. The active areas may be the same size as the selectable images in some cases, or may be smaller or larger than the selectable images in other cases. Additionally, an instrument 200 may be configured to construct inactive buffer regions 515 (e.g., non-active pixels) between the active areas 520.

Figure 5B:
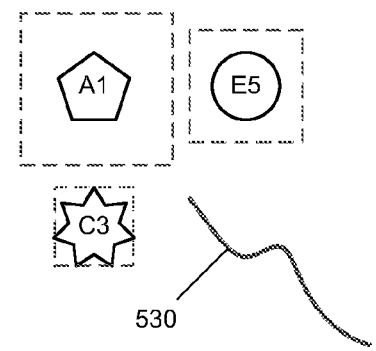

When a user moves a cursor, for example, towards a selectable image (B2) and the selectable image has a highest weighting value in a predicted path, instrument 200 may latch the selectable image, and its active area, to the approaching cursor. According to some embodiments, when an image is latched by the instrument, the active area 520 associated with the latched selectable image may expand, as depicted in FIG. 5B. The expanded active area can make it easier for the user to select the image. In some embodiments, the instrument 200 may also latch and expand active areas for other nearby selectable images that have a high likelihood of being selected. For example, selectable images that have a likelihood greater than about 30% may be latched by instrument 200, in some embodiments. In some implementations, selectable images that have a likelihood greater than about 50% may be latched by the instrument.

Figure 5C:
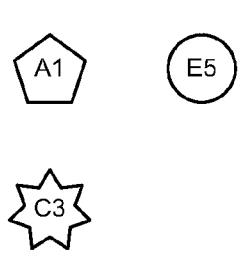
Figure 5D:
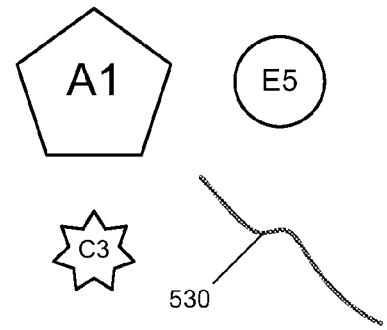

In some implementations, only the image area of the selectable image may be active, as depicted in FIG. 5C. For example, selectable images may be identified in a software application using an Automation API such as the "Microsoft Automation Framework" API that is in operation on instrument 200. If such an API is not available or configured to work with an application, an image displayed on the visual display may be captured by instrument 200, and edge-detection algorithms employed to determine active areas for one or more selectable images displayed by the instrument. In some embodiments, instrument 200 may be configured to visually expand the size of a latched selectable image as a user moves a cursor towards the image, as depicted in FIG. 5D.

A selectable image may be unlatched (e.g., return to an initial state) when a user moves a cursor past the image, or moves a cursor in a direction away from the latched image, for example. In some embodiments, a selectable image may be relatched if the user has overshot the image and reverses direction toward the selectable image.

According to some embodiments, an instrument 200 may be configured to alter the appearance of a latched selectable image having a highest weighting value. For example, the image may be blinked, be outlined, or change color. The altered appearance can signal the user that the selectable image is determined by the instrument 200 to be the most likely image that the user will select, and indicate that the instrument 200 is ready to receive a selection input for that image. In some embodiments, an instrument 200 may be configured to accept a selection input at any time, regardless of cursor position, for a latched selectable image having an altered appearance or highest weighting value while the appearance is altered or its weighting value is the highest. A highest weighting value may be indicated by an increased size of the selectable image. This can further facilitate selection of an image by a user, since the cursor may be at any location on the visual display, for example. In some implementations, an instrument 200 may maintain the altered appearance of the selectable image for a minimum amount of time (e.g., a time interval between approximately 0.5 sec and approximately 4 seconds), to provide the user with a suitable amount of time in which to select the image.

Figure 6:
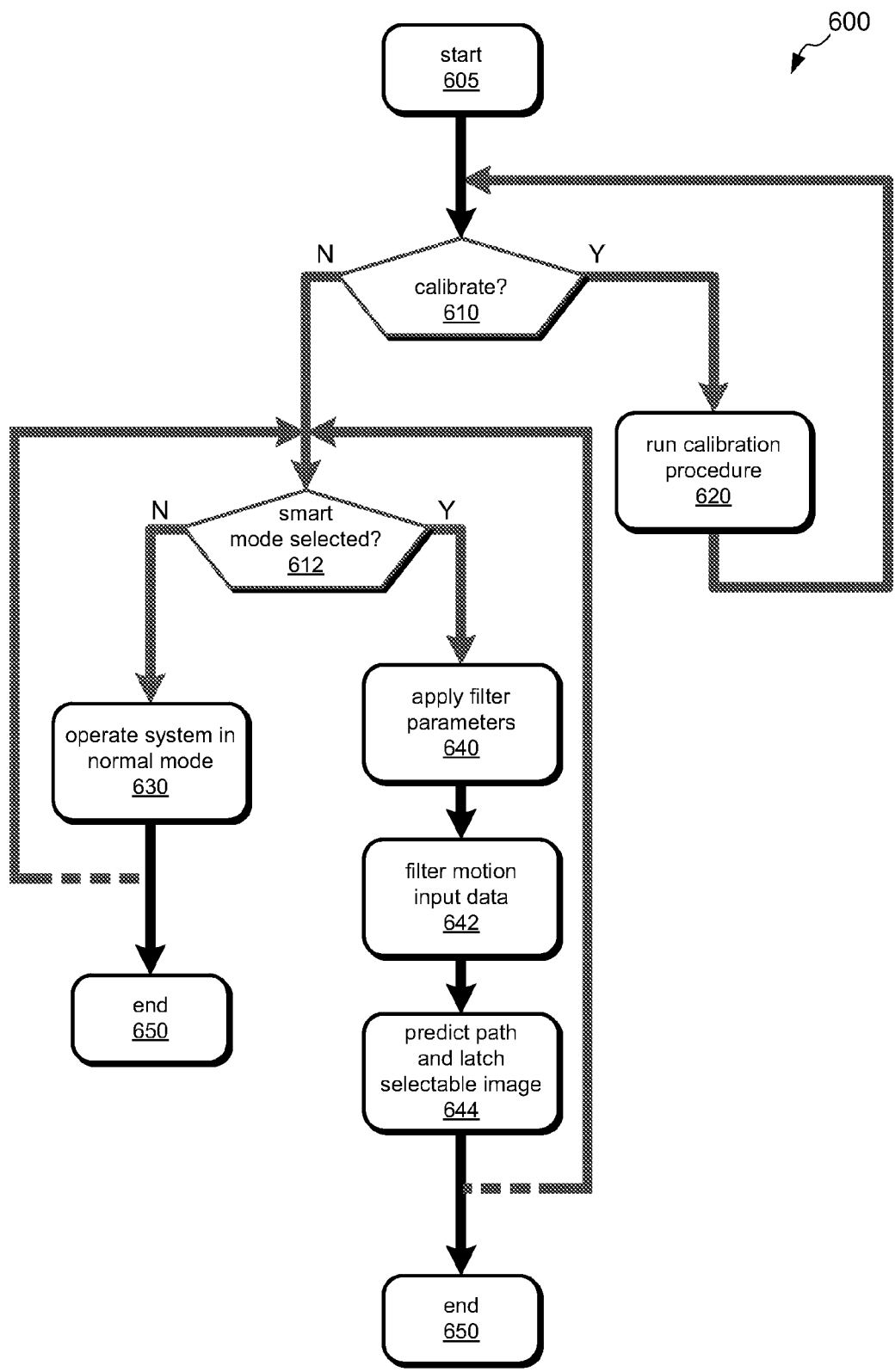
FIG. 6 represents some acts of an algorithm that may be used to reduce the effects of erratic motion input, according to some embodiments.

FIG. 6 depicts a method 600 that may be implemented on an instrument 200 to reduce effects of erratic motion input, according to some embodiments. The method 600 may begin with powering on or starting 605 an instrument 200. In some embodiments, the instrument may be configured to provide a calibration query 610 to the user. The calibration query may ask the user if a motion-input calibration is desired. In some implementations, a motion-input calibration routine may be selectable at any time by a user, without a query being provided to the user. If a motion-input calibration is requested, then the instrument may run 620 a motion-input calibration procedure. In some embodiments, after execution of a calibration procedure, the instrument 200 may return to a state in which it may receive a subsequent request for motion-input calibration.

If motion-input calibration is not required (e.g., a calibration was executed previously), the instrument may determine 612 whether a smart motion-input mode or normal motion-input mode of operation is desired. For example, some users may operate a system in normal motion-input mode, whereas other users may require a smart motion-input mode. In some embodiments, the instrument may determine which mode is to be used based on user identification. In some implementations, a user may manually select a motion-input mode. In some cases, the instrument 200 may provide a prompt to the user to select a motion-input mode. In some instances, an instrument 200 may include an accelerometer that detects motion of the instrument and determine 612 automatically that a smart motion input mode is needed based upon excessive vibrations or instrument motion detected by the accelerometer.

If it is determined 612 by the instrument that a smart motion-input mode is not to be used, the instrument may continue operation in a normal motion-input mode. A normal motion-input mode may be a conventional mode in which conventional motion-tracking features (e.g., conventional mouse-tracking features) are employed. After completion of system operation, the method may end 650.

If it is determined 612 that a smart motion-input mode is to be used, the instrument may apply 640 or provide a signal to cause application of filter parameters to at least one spatial filter that is used to process motion-input data received from one or more of the instrument's motion sensors that are configured to detect a user's motion input. The one or more filters may comprise an FIR filter, as described above according to some embodiments, though other filters may be used in some implementations. The parameters may comprise values computed during a calibration procedure, as described above for example, and may include values for filter tap coefficients, filter order, cut-off frequency, pole location, zero location, and/or other relevant values. The filter parameters may be user-specific. As noted above, filter parameters may be computed and applied independently for different motion-input directions (e.g., x and y axes).

Received motion-input data may then be spatially filtered 642 by the one or more filters configured with the applied filter parameters. In some aspects, the filtering comprises spatial filtering of an image of an actual path 410 input by the user. In various embodiments, the filtering produces a smoothed path 420, which may be used by the instrument 200 to identify and/or represent the user's input motion. The smoothed path 420 may not be displayed on the visual display 105 in some embodiments.

According to some implementations, a method 600 further comprises predicting 644 a path for subsequent user input motion, and latching at least one selectable image in the predicted path. As described above, a predicted path may comprise an area of the visual display in which the user is likely to move a cursor, stylus, or finger. One or more selectable images within the area may be weighted by the instrument 200 with a value representing the likelihood that the image will be selected by the user. In some implementations, a selectable image having a highest weighting value may be latched to the cursor, stylus, or finger, and its appearance may change to indicate it is most likely to be selected. When operation of the instrument 200 is completed, the method 600 may end 650.

In some implementations, an instrument 200 may be configured to return to a state of determining 612 whether normal motion-input operation or smart motion-input operation is desired, as depicted by the dashed lines in FIG. 6. In some embodiments, the instrument may be configured to return to a state of determining 610 whether a motion-input calibration is desired. For example, if the user completes a session with the instrument and logs out (or is automatically logged out), the instrument may be configured to return to a state in which it can accept input from another user who may, or may not, require a smart motion-input mode of operation.

Figure 7:
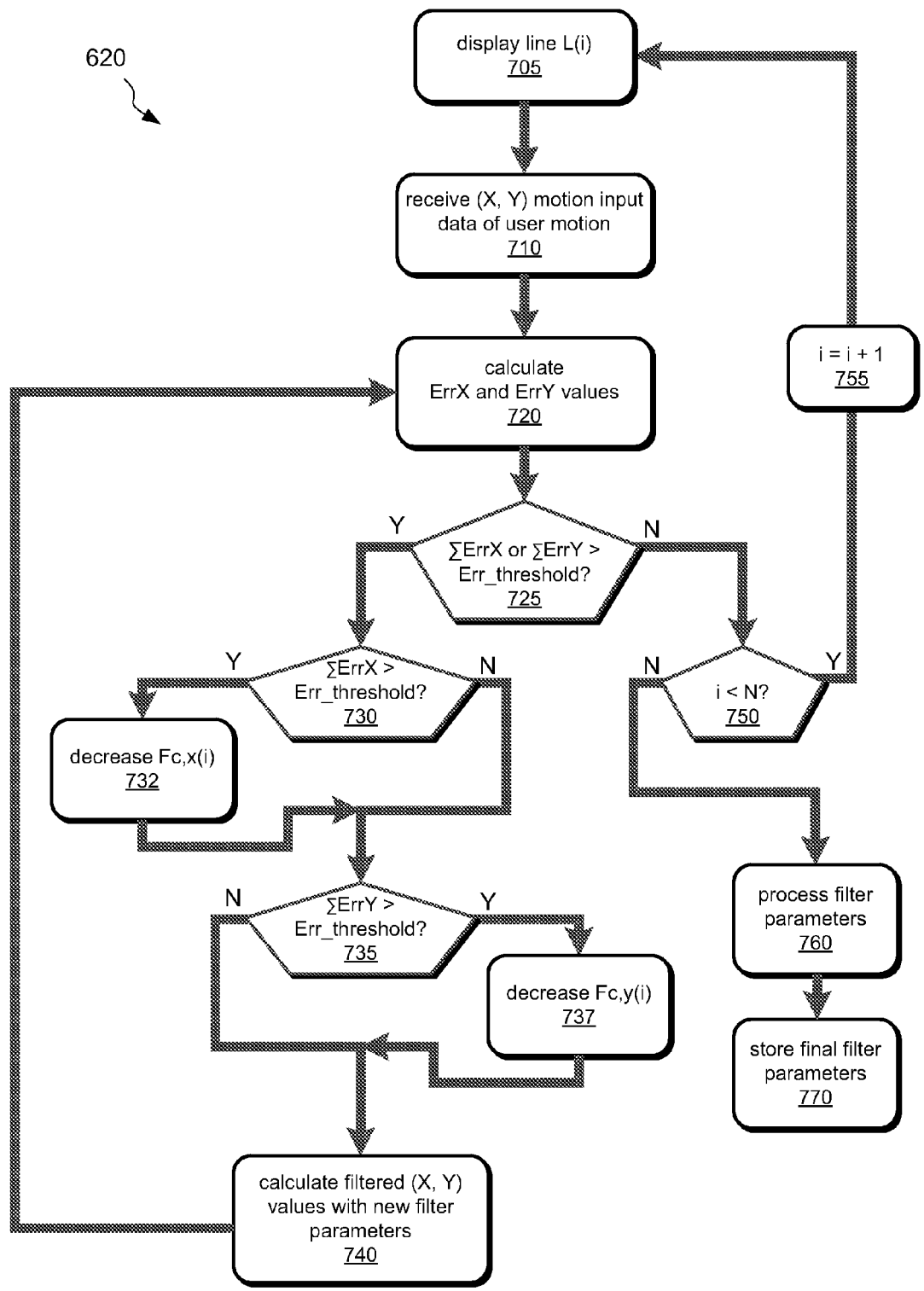
FIG. 7 represents some acts of an algorithm that may be used to calibrate motion-input filters for reducing the effects of spurious motion input, according to some embodiments.

An embodiment of a calibration procedure 620 is depicted in FIG. 7 for teaching purposes, but is not intended to be limiting to only the acts illustrated. Modifications of the calibration procedure may be employed in other embodiments. Aspects of the calibration procedure may be better understood with reference to FIG. 4B. According to some embodiments, an instrument may be configured such that a user may initiate a calibration procedure 620 at any time, e.g., by selecting a calibration icon or menu item.

A calibration procedure 620 may comprise an iterative process that is run several times to compute several sets of filter parameters. The filter parameters from the different calibration runs may be averaged to obtain final parameter values, according to some embodiments. For each run, a reference line 430 may be displayed and a user may try to trace the line.

According to some embodiments, a calibration procedure comprises displaying 705, by instrument 200, a reference path (L[i]) 430 on a visual display 105. A cursor 140 may be displayed at one end of the reference path. The reference path may be straight or curved. In some implementations, the reference path may extend only along one axis at a time (e.g., a first path along the x axis, a second path along the y axis). A user may then move the cursor 140 along the reference path 430. As the user moves the cursor, the instrument 200 may receive 710 values (x, y) and/or ($\Delta$x, $\Delta$y) for motion input data representative of a user's motion to trace the reference path 430. The user's actual motion may proceed along the actual path 440, which can differ appreciably from the reference path.

The instrument 200 may then calculate 720 and sum motion error values that represent an amount of discrepancy between the reference path 430 and the actual path 440 or a smoothed path 420. In some embodiments, an error value is calculated separately for each motion input axis (e.g., ErrX[n], ErrY[n]). In some embodiments, a value of motion error may be computed from a point P on the actual path 440 or smoothed path 420 and a corresponding position R on the reference path 430. The corresponding position may be a position at which a perpendicular line from the reference path 430 intersects the point P. The error values ErrX[n], ErrY[n] may then be computed as the absolute value of the differences in x and y coordinates between the points P and R, according to some embodiments.

In some implementations, error values may be computed in terms of $\Delta$x, $\Delta$y values. For example, from an initial location of cursor 140, a first motion increment along the reference path may be ($\Delta x_r[n]$, $\Delta y_r[n]$). A user may move the cursor along the actual path 440 resulting in a first motion increment of ($\Delta x_a[n]$, $\Delta y_a[n]$). Accordingly, values for motion input errors may be calculated as ErrX[n]=|$\Delta x_a[n]-\Delta x_r[n]$| and ErrY[n]=|$\Delta y_a[n]-\Delta y_r[n]$|.

In some cases, for a first pass through the calibration procedure 620, motion-input data values for an actual path may be used. Subsequently, motion-input data values for a smoothed (filtered) path may be used. In some implementations, default filter parameters may be used initially, so that first and successive passes through a calibration procedure 620 use motion-input data values for a smoothed path.

Error values for each axis may be summed and compared 725 to corresponding threshold values (Err$_{thrx}$, Err$_{thry}$). The threshold values may be chosen to limit an amount of deviation of a smoothed path 420 from a reference path 430. Suitable threshold values may be determined from research trials that establish a range of threshold values over which improved user operation occurs.

If it is determined 730 that a summed error $\Sigma$ErrX for the x axis is greater than an x-axis threshold value, then at least one parameter for the x-axis filter may be adjusted. For example, a cut-off frequency $F_{c,x}[i]$ may be decreased 732 by a preselected amount. In some implementations, the cut-off frequency may be changed by increasing the value of N and/or M in EQ. 1A or 1B by 1. If it is determined 730 that a summed error for the x axis is less than or equal to an x-axis threshold value, then no changes may be made to the x-axis filter parameters. Similar acts of determining an amount of error 735 and adjusting a filter parameter 737 may be performed for the y-axis filter, as indicated in FIG. 7.

After the filter parameters have been adjusted, a filtered or smoothed path 420 (not shown in FIG. 4B) may be computed 740 using the adjusted filter parameters. The calibration procedure 620 may then loop back to calculating 720 error values between the smoothed path and reference path. The acts 725, 730, 732, 735, 737, and 740 may be repeated until the filter parameters are such that the summed errors $\Sigma$ErrX, $\Sigma$ErrY between the smoothed path and reference path 430 are below the corresponding threshold values. The instrument may then store the filter parameters, and determine 750 whether fewer than N calibration runs have been performed. N may be a predetermined integer having any value between 1 and 10. In some embodiments, N has a value between 1 and 5. If fewer than N calibration runs have been performed, the instrument may increment 755 a calibration counter [i], and loop back to displaying 705 a new reference line (L[i+1]). An additional calibration run may then be executed.

According to some embodiments, if the predetermined number of calibration runs have been completed, then the filter parameters calculated for each calibration run (i=1, 2, . . . N) may be processed 760 to determine final filter parameters. For example, an x-axis filter cut-off frequency $F_{c,x}$ may be calculated as follows.

$$F_{c,x} = \frac{1}{N}\sum_{i=1}^{N} F_{c,x}[i] \quad (6)$$

Other filter parameters may be processed in a similar manner, e.g., an average value for each parameter may be computed from the results of several calibration runs. In some implementations, a mode of the values may be taken rather than a mean. Other methods for determining final filter parameters may be used in other embodiments.

Once the final filter parameters have been computed, the instrument 200 may store the parameters for subsequent use. In some embodiments, the parameters may be stored in association with a user ID, so that the filter parameters can later be retrieved and used for the particular user for which the parameters were determined. In some implementations, final filter parameters may be exported to a mouse or remote controller 230 for storage there and/or for immediate use. In some implementations, the final filter parameters may be applied to an on-board motion-input filter at the instrument 200 or remote controller 230 (e.g., an on-board ASIC filter, FPGA filter, digital signal processor, or filter embodied in software).

In some embodiments, part of the calibration procedure 620 may run on the instrument 200, and part may run on the remote controller 230. For example, a remote controller 230 may include an ASIC or FPGA configured to filter the received motion data, and transmit the filtered data to a processor on the instrument 200 for further analysis. The instrument may compute filter parameters and transmit the resulting parameters back to the remote controller 230 for subsequent use in filters at the remote controller.

Figure 8:
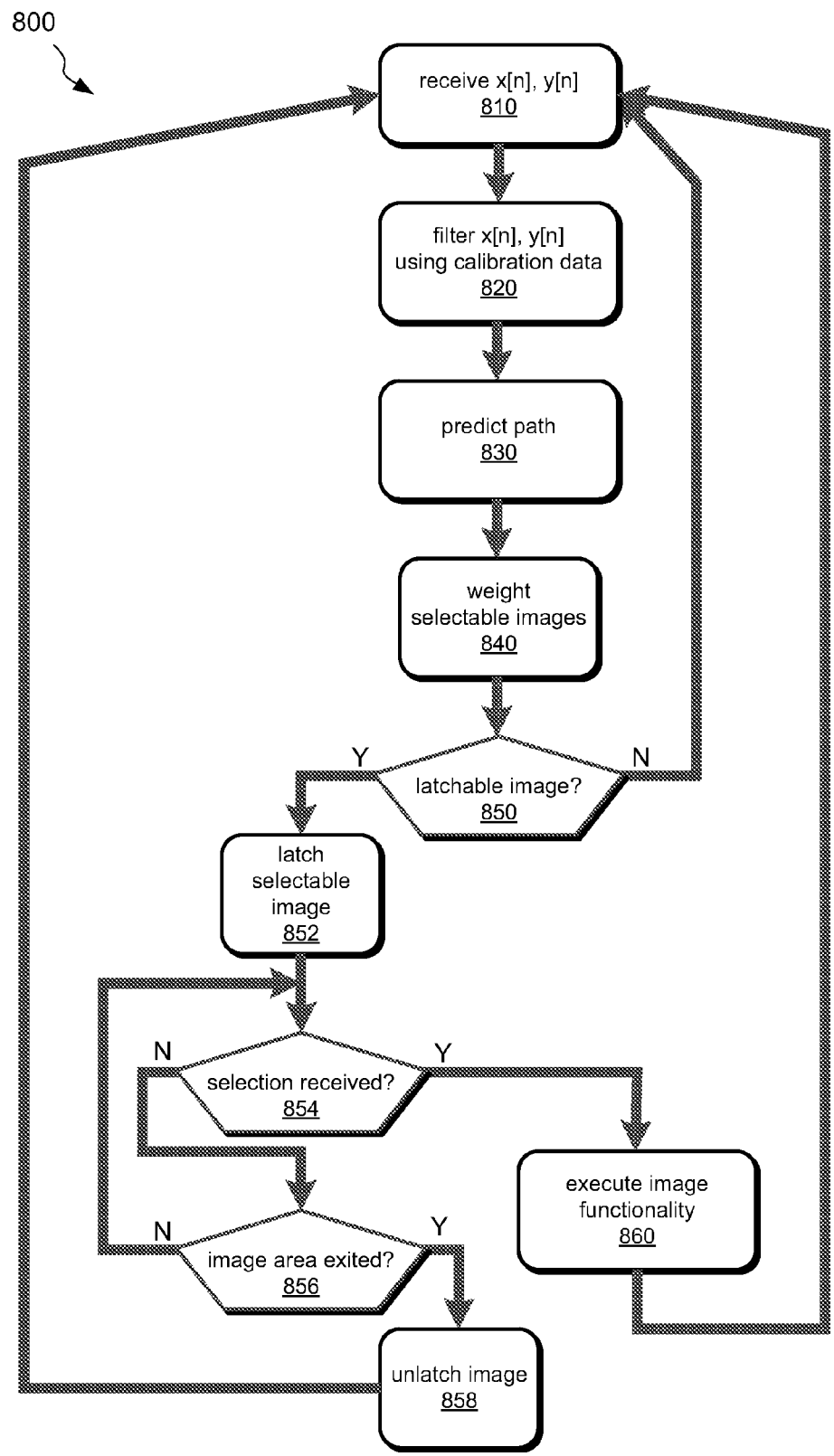
FIG. 8 represents some acts of an algorithm that may be used to reduce the effects of erratic motion input, according to some embodiments.

Final filter parameters may be implemented in a motion-input filter of the instrument 200 following a calibration procedure 620, or may be loaded from memory based upon a user identification. In some embodiments, a user may load filter parameters computed for another instrument onto the instrument 200. When implemented on a motion-input filter, an instrument 200 may then be specially adapted to process motion input to reduce effects of spurious motion, e.g., via a method 800 illustrated in FIG. 8.

According to some embodiments, an instrument 200 may receive 810 motion input data (x[n], y[n]) from one or more motions sensors, wherein the motion input is representative of an input motion produced by a user an intended to operate the instrument through a graphical user interface. The motion-input data may be representative of an actual path of motion over which a user may move a cursor, stylus, or finger on the interface. The instrument 200 may filter 820 the motion data using calibration data (e.g., one or more filter parameters obtained by a calibration routine). The filtering may comprise separately filtering motion data with different filters for each axis of motion. For example, x-axis motion data may be filtered with a first filter having a first set of filter parameters, and y-axis motion data may be filtered with a second filter having a second set of filter parameters that is different from the first filter parameters. The filters may be FIR filters having different cut-off frequencies, according to some embodiments.

In some embodiments, the instrument may display motion of a cursor on a visual display according to the filtered motion-input data. The filtered motion-input data may provide a smoothed path that the instrument 200 uses to identify motion input by the user. The smoothed path may exhibit significantly less spurious motion than an actual path executed by the user.

In some implementations, an instrument 200 may predict 830 a path in which further motion is expected to occur. The predicted path 415 may encompass an area of a visual display 105 and depend upon an average direction and/or speed of a moving cursor, stylus, or finger, as described above in connection with FIGS. 4A-4B. There may be one or more selectable images within or partially within the predicted path 415. In some embodiments, one or more of the selectable images lying within or partially within the predicted path may be weighted 840 according to a likelihood that the selectable image will be selected by the user. The weighting value may depend on how centrally the image is located within the predicted path and/or a speed of a cursor, stylus, or finger.

According to some embodiments, the instrument may determine 850 whether a weighted image is latchable. For example, the instrument 200 may determine whether a weight of one selectable image is appreciably greater than other selectable image weights. An image may be latched when a weight of one image is at least 25% greater than a weight for any other selectable image in some embodiments, at least 50% greater than a weight for any other selectable image in some embodiments, at least 100% greater than a weight for any other selectable image in some embodiments, and yet at least 200% greater than a weight for any other selectable image in some embodiments. If it is determined that an image is not latchable, the instrument 200 may continue to receive 810 motion-input data.

If it is determined that a selectable image is latchable, the instrument 200 may latch 852 the selectable image to an approaching cursor, stylus, or finger. In some implementations, a latched image may be the only selectable image that can be selected while it is latched. In some embodiments, multiple images may be latched and aspects of the images may change in accordance with their weighting value, as described above in connection with FIGS. 5A-5D. In some implementations, a latched image having a highest weighting value may change in appearance while latched and be selectable by a cursor at any location on the screen while having a changed appearance. The instrument may then determine 854 whether a user selection for a latched image has been received. If a user selection has been received, the instrument may execute 860 functionality associated with the selectable image, and return to a state of receiving 810 motion-input data.

If a user selection for the selectable image has not been received, the instrument 200 may determine 856 whether an active area for the latched selectable image has been exited. For example, a user may move a cursor beyond the latched image, or move the cursor in a direction away from the latched image. If it is determined that the image area has been exited, the instrument 200 may unlatch 858 the image and return to a state of receiving 810 motion-input data.

Methods described above may be embodied as machine-readable instructions stored on at least one manufactured storage device, e.g., ROM, RAM, CD-ROM, DVD-ROM, magnetic disks, CMOS memory chips, removable memory devices, etc. The machine-readable instructions, when executed by at least one processor, particularly adapt the at least one processor and instrument 200 to perform some or all of the acts as set forth in the methods described above.

Accordingly, one or more embodiments include a manufactured storage device containing machine-readable instructions that, when executed by at least one processor associated with an instrument interface, specially adapt the instrument to: (a) sense, with motion sensors, first user-input motion in at least two dimensions, (b) produce two-dimensional motion data representative of first the user-input motion, (c) filter, with a first filter having adjustable first filter parameters, the motion data for a first dimension, and (d) filter, with a second filter having adjustable second filter parameters, the motion data for a second dimension. In some embodiments, a manufactured storage device further includes machine-readable instructions that independently reconfigure at least the first filter parameters from the second filter parameters based at least upon the first user-input motion. The reconfiguring may be done through software operation (e.g., through a user's manual selection of filter values or through an automatic or semi-automatic calibration process).

In some aspects, machine-readable instructions may further adapt the instrument to display a reference path on a visual display of the instrument interface, wherein the first user-input motion is representative of tracing the reference path. In some implementations, the machine-readable instructions may further adapt the instrument to compute a smoothed path from the filtered motion data, determine first filter parameters for the first filter by reducing an error in a first direction between the smoothed path and the reference path, and determine second filter parameters for the second filter by reducing an error in a second direction between the smoothed path and the reference path.

According to some implementations, at least the first filter comprises a first low-pass filter having a first cut-off frequency and wherein the act of independently reconfiguring comprises altering the first cut-off frequency independent of changing a parameter for the second filter. In some aspects, at least the first filter comprises a multi-tap, finite impulse response filter. The number of taps may be greater than 10 in some cases.

In some aspects, machine-readable instructions may further adapt the instrument to display and move a cursor on a visual display of the instrument interface representative of second user-input motion. In some cases, machine-readable instructions may further adapt the instrument to determine a predicted path for the second user-input motion based upon filtered motion data for the second user-input motion, and assign a weighting value to at least one selectable image in the path.

In some implementations, machine-readable instructions may further adapt the instrument to latch a selectable image in the predicted path based at least upon a weighting value of the selectable image. In some aspects, machine-readable instructions may further adapt the instrument to allow selection of only a latched selectable image while the selectable image is latched. In some aspects, machine-readable instructions may further adapt the instrument to change the appearance of the latched selectable image while the selectable image is latched.

The foregoing aspects and implementations of machine-readable instructions may be included in any suitable combination on a data storage device. When implemented on at least one processor of an instrument that is capable of providing a graphical user interface, the machine-readable instructions specially adapt the instrument to reduce the effects of spurious user-input motion. Reducing effects of spurious or erratic user-input motion data can make an instrument more accessible to individuals having neuromuscular impairments and improve operability of an instrument in high-vibration environments. The described apparatus and methods may reduce hand strain, reduce selection or click errors, and may increase productivity.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Although the above structures and methods have been described primarily for two-dimensional motion input, the structures and methods may be implemented for three-dimensional motion input in some embodiments. For example, a remote controller 230 may comprise a hand-held controller sensing motion along three axes. In some implementations, the structures and methods may be extended to additional degrees of freedom, e.g., rotational degrees of freedom in addition to linear motion. Motion-input filters may be calibrated for each degree of freedom in some embodiments.

Some instruments 200 may include on-board motion sensors that can detect motion of the instrument itself. For example, a smart phone may be equipped with one or more on-board accelerometers. In some embodiments, an instrument may be configured to switch automatically to a smart motion-input mode when at least one on-board sensor detects a level of motion of the instrument that is greater than a predetermined threshold value. In some implementations, an instrument may provide a prompt (e.g., interactive panel) to the user to inquire whether the user would like to switch to a smart motion-input mode when at least one on-board sensor detects a level of motion of the instrument that is greater than a predetermined threshold value. The user may then activate the smart motion-input mode using the panel.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An instrument interface comprising:
   motion sensors configured to sense motion representative of a first user input and a second user input in at least two dimensions and produce two-dimensional motion data for the first user input and the second user input, respectively;
   a first filter configured to filter the motion data corresponding to a first dimension;
   a second filter configured to filter the motion data corresponding to a second dimension; and a processor configured to receive a request for motion-input calibration and, in response to receiving the request for motion-input calibration:
cause a reference path and a cursor located at an end of the reference path to be displayed,
prompt a user to move the cursor along the reference path,
identify motion corresponding to the second user input based upon first filtered motion data received from the first filter and second filtered motion data received from the second filter,
compute errors based on a plurality of sampled data points on an actual path resulting from the first user input and a plurality of corresponding points on the reference path,
reconfigure the first parameters for the first filter based on the computed errors, and
reconfigure the second parameters for the second filter based on the computed errors, the second parameters for the second filter being reconfigured independently from the first parameters for the first filter.

2. The instrument interface of claim 1, wherein the first filter or the second filter comprises a low-pass filter having a cut-off frequency that is reconfigurable through software operation.

3. The instrument interface of claim 1, wherein the first filter or the second filter comprises a multi-tap, finite impulse response filter.

4. The instrument interface of claim 3, wherein the number of taps is greater than 10.

5. The instrument interface of claim 1, further comprising:
a visual display in communication with the processor, wherein the visual display is configured to display the reference path,
wherein the software operation includes reducing at least one of the errors by adjusting at least one of the filter parameters.

6. The instrument interface of claim 5, wherein the processor is further configured to display and move the cursor on the visual display representative of the identified motion.

7. The instrument interface of claim 1, wherein the processor is further configured to assign a weighting value to the at least one selectable image in the path.

8. The instrument interface of claim 7, wherein the processor is further configured to latch a selectable image in the path based at least upon a weighting value of the selectable image.

9. The instrument interface of claim 8, wherein a latched selectable image is an only selectable image that may be selected by the user while the selectable image is latched.

10. The instrument interface of claim 8, wherein the processor is configured to change the appearance of the latched selectable image while the selectable image is latched.

11. The instrument interface of claim 1, wherein the visual display comprises a screen of a computer or a screen of a smart phone.

12. The instrument interface of claim 1 embodied as a remote controller, wherein the motion sensors, first filter, and second filter are located at the remote controller.

13. The instrument interface of claim 1, wherein the processor is configured to predict a path for the second user input based upon the identified motion.

14. The instrument interface of claim 13, wherein the processor is configured to expand at least one active area associated with at least one selectable image in the predicted path.

15. A method for operating an instrument interface, the method comprising:
receiving, by a processor, a request for motion-input calibration;
in response to receiving the request for motion-input calibration:
causing, by the processor, a reference path and a cursor located at an end of the reference path to be displayed;
prompting, by the processor, a user to move the cursor along the reference path;
sensing, with motion sensors, a first user input in at least two dimensions, the first user input corresponding to an actual path that results from the user attempting to move the cursor along the reference path;
producing two-dimensional first motion data representative of the first user input;
filtering, with a first filter, the first motion data for a first dimension;
filtering, with a second filter, the first motion data for a second dimension; and
computing, by the processor, errors based on a plurality of sampled data points on the actual path and a plurality of corresponding points on the reference path;
reconfiguring, by the processor, the first parameters for the first filter based on the computing of the errors, and
reconfiguring, by the processor, the second parameters for the second filter based on the computing of the errors, the reconfiguring of the second parameters for the second filter being independent of the reconfiguring of first parameters for the first filter;
sensing, with the motion sensors, a second user input in at least two dimensions;
producing two-dimensional second motion data representative of the second user input;
filtering, with the first filter, the second motion data for the first dimension;
filtering, with the second filter, the second motion data for the second dimension; and
identifying, by the processor, motion corresponding to the second user input based upon first filtered motion data received from the first filter and second filtered motion data received from the second filter.

16. The method of claim 15, further comprising:
computing a smoothed path from the filtered motion data for the first dimension and second dimension;
determining first filter parameters for the first filter by reducing an error in a first direction between the smoothed path and the reference path; and
determining second filter parameters for the second filter by reducing an error in a second direction between the smoothed path and the reference path.

17. The method of claim 15, wherein at least the first filter comprises a first low-pass filter having a first cut-off frequency and wherein the act of independently reconfiguring comprises altering the first cut-off frequency independent of changing a parameter for the second filter.

18. The method of claim 15, wherein at least the first filter comprises a multi-tap, finite impulse response filter.

19. The method of claim 18, wherein the number of taps is greater than 10.

20. The method of claim 15, further comprising displaying and moving the cursor on a visual display of the instrument interface representative of second user-input motion.

21. The method of claim 20, further comprising:
determining a predicted path for the second user-input motion based upon filtered motion data for the second user-input motion; and
assigning a weighting value to at least one selectable image in the path.

22. The method of claim 21, further comprising latching a selectable image in the predicted path based at least upon a weighting value of the selectable image.

23. The method of claim 22, further comprising permitting selection of only a latched selectable image while the selectable image is latched.

24. The method of claim 22, further comprising changing the appearance of the latched selectable image while the selectable image is latched.

25. The method of claim 24, further comprising permitting selection of the latched selectable image regardless of cursor position while the appearance of the latched selectable image is changed.

26. The method of claim 15, wherein the reconfiguring includes reducing at least one of the errors by adjusting at least one of the filter parameters.

27. The method of claim 15, further comprising predicting a path for the second user input based upon the identified motion.

28. The method of claim 27, further comprising expanding at least one active area associated with at least one selectable image in the predicted path.

* * * * *